United States Patent
Planeta et al.

[11] Patent Number: 6,164,811
[45] Date of Patent: Dec. 26, 2000

[54] EXTRUDER ASSEMBLY WITH IMPROVED SCREW REMOVAL CAPABILITY

[75] Inventors: Mirek Planeta, Mississauga; Nghia Paul C. Dang, Toronto; Jozef Suhay, Orangeville, all of Canada

[73] Assignee: Macro Engineering & Technology Inc., Mississauga, Canada

[21] Appl. No.: 09/333,672

[22] Filed: Jun. 16, 1999

[51] Int. Cl.[7] .............................. B01F 7/00; B01F 15/00; B29C 47/00; B29B 17/00
[52] U.S. Cl. ............................ 366/79; 366/100; 366/331
[58] Field of Search .................................. 366/78, 79, 96, 366/97, 98, 100, 318, 331, 332; 425/186, 189, 190

[56] References Cited

U.S. PATENT DOCUMENTS

| | | | |
|---|---|---|---|
| 2,404,630 | 7/1946 | Griffiths | 425/190 |
| 2,957,427 | 10/1960 | O'Connor | 366/318 |
| 3,593,379 | 7/1971 | Hendry | 366/100 |
| 3,702,691 | 11/1972 | Fritsch | 366/100 |
| 3,734,667 | 5/1973 | Dray | 425/190 |
| 3,811,658 | 5/1974 | Heidrich | 366/79 |
| 3,923,290 | 12/1975 | Tillis | 366/100 |
| 4,075,712 | 2/1978 | Geyer | 366/79 |
| 4,527,899 | 7/1985 | Blach et al. | 366/79 |
| 5,119,721 | 6/1992 | Satake et al. | 366/318 |

*Primary Examiner*—Tony G. Soohoo
*Attorney, Agent, or Firm*—Robert F. Delbridge

[57] ABSTRACT

An extruder assembly has a gear box drivable by a motor, an output shaft having a main portion extending through the gear box and rotatable by operation of the motor and gear box, and an extruder housing located forwardly of the gear box. The output shaft has a further portion extending forwardly from the main portion and passing into the extruder housing and having a screw configuration therein for feeding plastic material through the housing when the output shaft is rotated. The main portion of the output shaft is axially slidable in the gear box, and the forwardly extending portion has a diameter not greater than the diameter of the main portion whereby the output shaft can be withdrawn from the housing and the gear box by rearward movement therethrough. A retainer is operable to retain the output shaft in an operative position for rotation to feed plastic material through the housing and also to permit the output shaft to be withdrawn by rearward movement when desired.

3 Claims, 4 Drawing Sheets

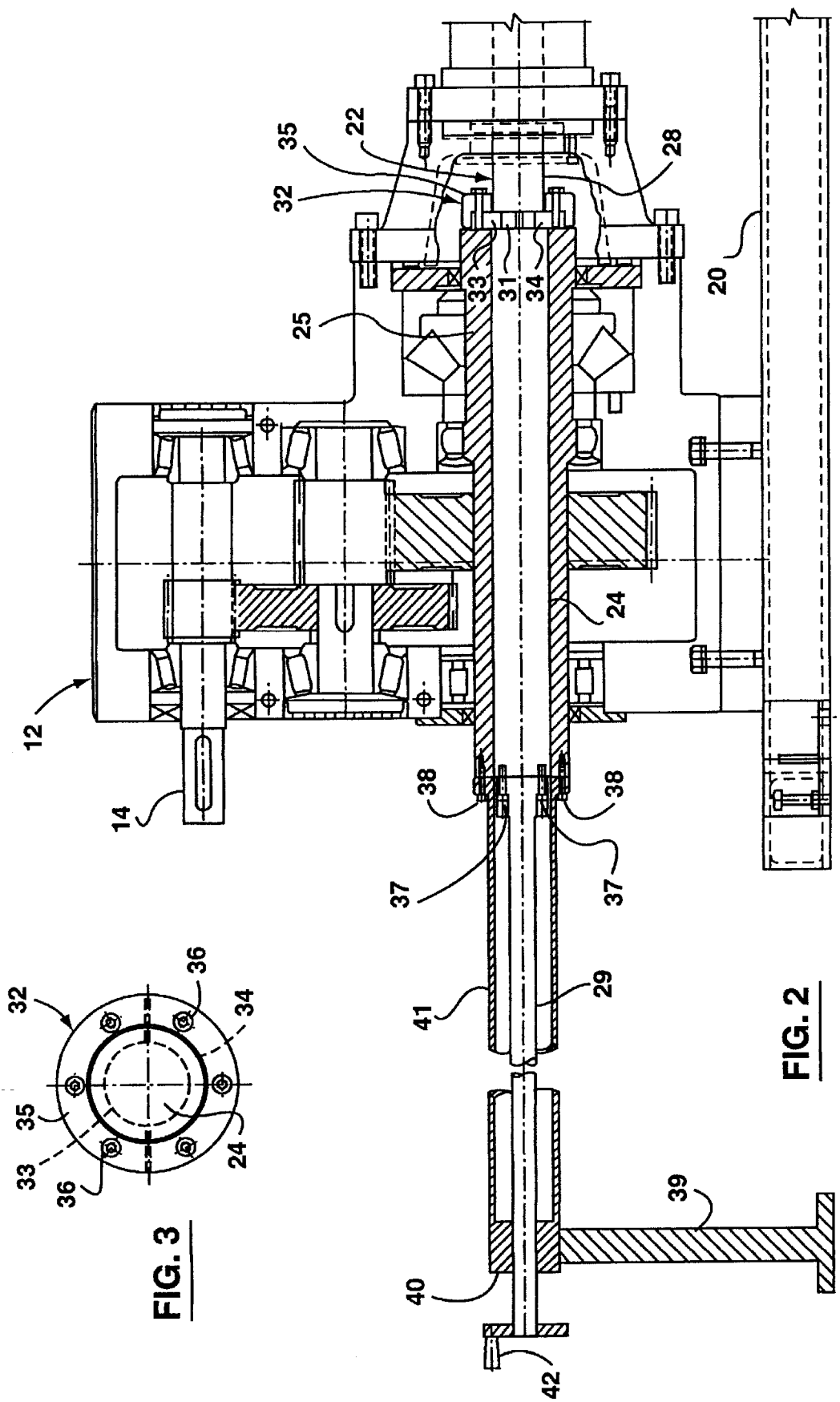

EXTRUDER ASSEMBLY WITH IMPROVED SCREW REMOVAL CAPABILITY

FIELD OF THE INVENTION

This invention relates to extruder assemblies with screw feeders.

BACKGROUND OF THE INVENTION

Conventional extruders for plastic material usually have screw feeders. Such screw feeders require regular cleaning and have to be removed from the extruder housing for this purpose. In conventional extruders, the screw feeder is removed from the housing in a forward direction, i.e. in the same direction as the plastic material is extruded therefrom. This is not particularly easy in most conventional extruders of this kind, particularly when several plastic materials are fed to an extrusion die from separate extruders.

It is therefore an object of the invention to provide an extruder with improved screw removal capability.

SUMMARY OF THE INVENTION

According to the invention, an extruder with a screw feeder is constructed in such a manner that the screw feeder can be removed from the extruder housing in a rearward direction, i.e. a direction opposite to that in which plastic material is extruded therefrom. Thus, screw feeder removal can be effected easily without having to move components in front of the extruder.

The present invention provides an extruder assembly having a gear box drivable by a motor, an output shaft having a main portion extending through the gear box and rotatable by operation of the motor and gear box, an extruder housing located forwardly of the gear box, the output shaft having a further portion extending forwardly from the main portion and passing into the extruder housing and having a screw configuration thereon for feeding plastic material through the housing when the output shaft is rotated. The main portion of the output shaft is axially slidable in the gear box, and the forward extending shaft portion has a diameter not greater than the diameter of the main portion whereby the output shaft can be withdrawn from the housing and the gear box by rearward movement therethrough. A retainer is operable to retain the output shaft in an operative position for rotation to feed plastic material through the housing and also to permit the output shaft to be withdrawn by said rearward movement when desired.

DESCRIPTION OF THE DRAWINGS

Embodiments of the invention will now be described, by way of example only, with reference to the accompanying drawings, in which:

FIG. 2 is an enlarged view of a portion of the extruder assembly of FIG. 1 showing the output shaft in the operative position, FIG. 3 is a front view of the shaft retainer.

Referring to the drawings, FIG. 1 shows an extruder assembly having a gearbox 12 with an input shaft rotatable by a motor (not shown) in a conventional manner, a material supply unit 16 and extruder 18 mounted on a base 20 in a manner which will be readily apparent to a person skilled in the art.

Figure 1:
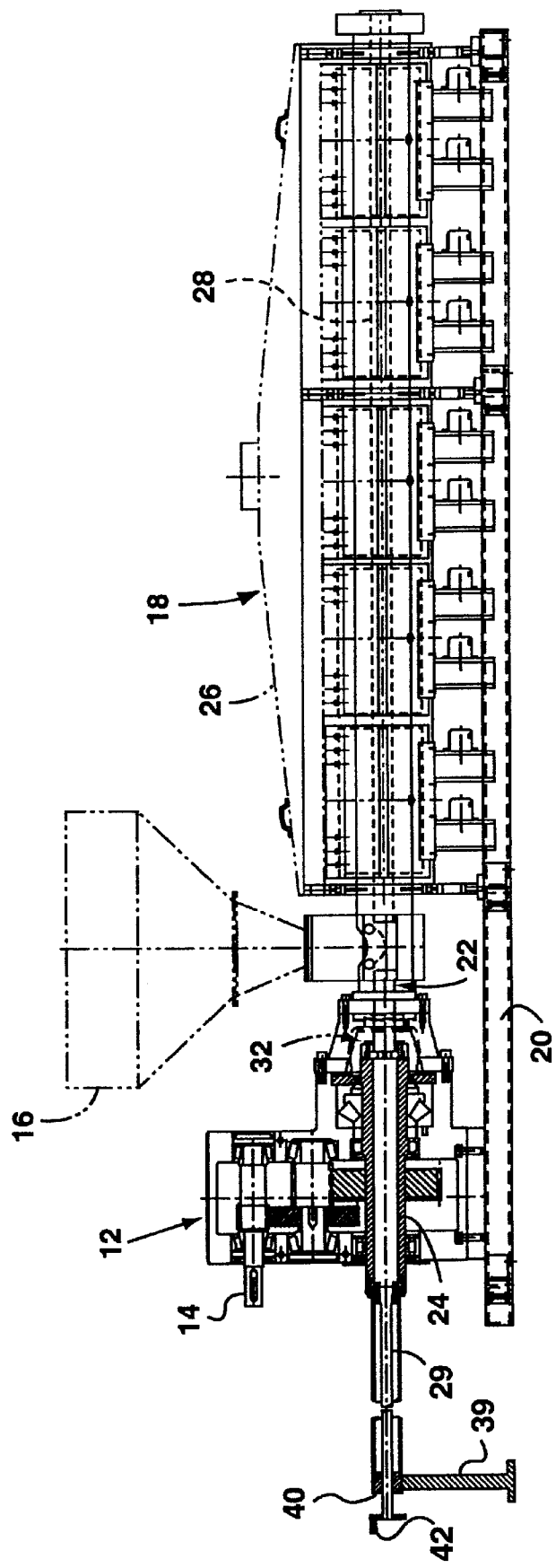
FIG. 1 is a longitudinal sectional view of an extruder assembly with an output shaft removable in a rearward direction in accordance with one embodiment of the invention.
Figure 4:
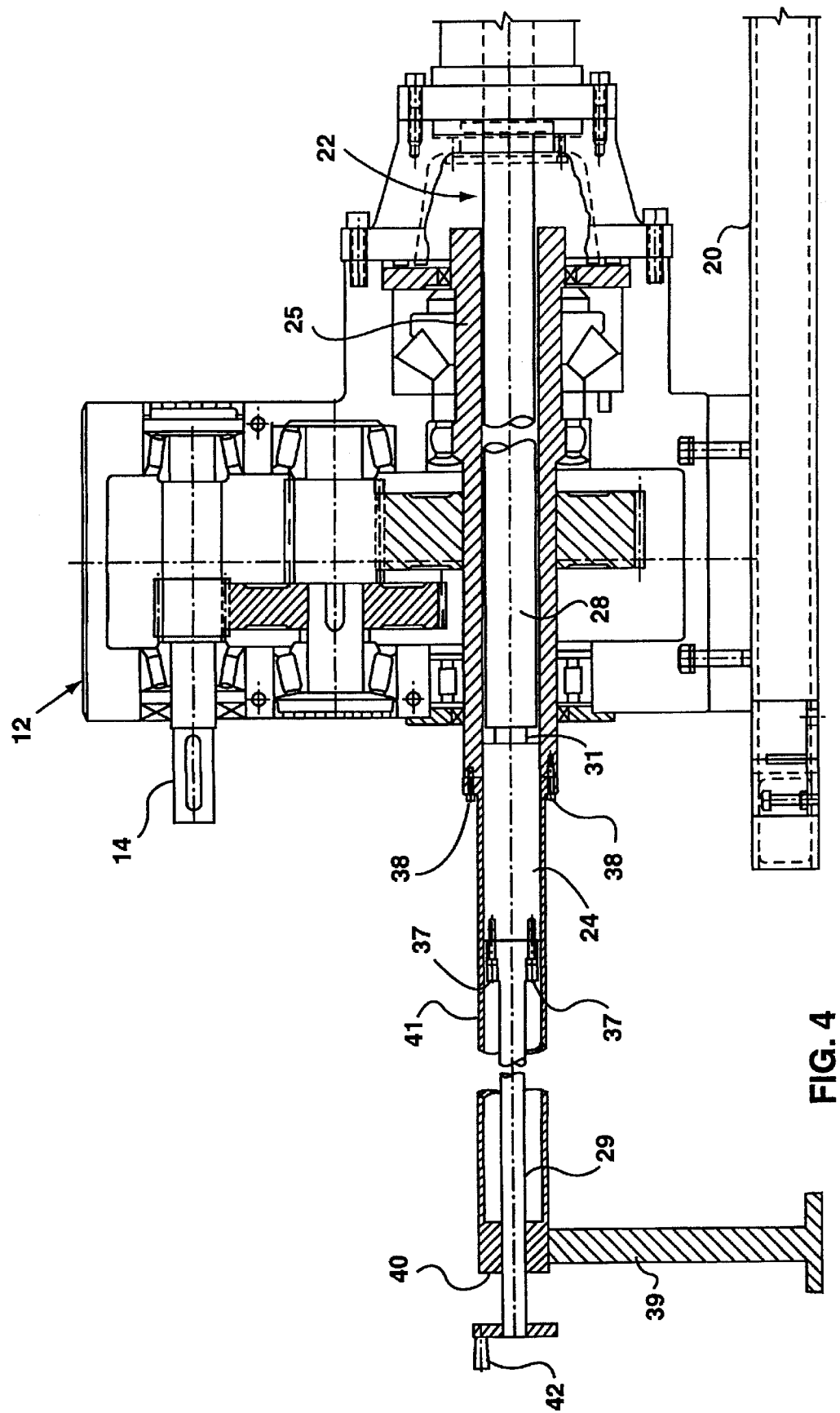
FIG. 4 is similar to FIG. 2 but showing the output shaft partially withdrawn from the remainder of the extruder assembly.

In accordance with the invention, and referring now also to FIGS. 2 to 4, the extruder assembly has an output shaft 22 with a main portion 24 which extends through a hollow shaft 25 in the gear box 12 which is rotated by gears therein when the input shaft 14 is rotated. The main shaft portion 24 has splines (not shown) which engage corresponding axially-extending recesses in the interior of the hollow shaft 25 so that rotation of the hollow shaft 25 effects rotation of the output shaft 22. The extruder 18 has a longitudinally-extending housing 26, and the output shaft 22 has a screw portion 28 extending forwardly from the main portion 24 through the material supply unit 16 and through the extruder housing 26. The screw portion 28 of the output shaft 22 feeds plastic material from the supply unit 16 through the housing 18 to its forward end for subsequent passage to an extrusion die (not shown).

The main portion 24 of the output shaft 22 is axially slidable in the gear box 14, and the screw portion 28 has a diameter slightly smaller than the diameter of the main portion 24. A retainer 32 is provided to retain the output shaft 22 in the operative position shown in FIG. 2.

As shown in FIG. 3, the retainer 32 comprises split rings 33, 34, which, in use, are bolted by an annular flange 35 and bolts 36 to the front end of hollow shaft 25. The split rings 33, 34 are seated in an annular recess 31 in the output shaft 22 between the main shaft portion 24 and the screw portion 28. The retainer 32 is easily removed by removing the bolts 36 and then the flange 35 and split rings 33, 34.

In normal operation of the extruder assembly, the motor drives the gear box 12 which, in turn, drives the output shaft 22. Plastic material fed from the supply unit 16 is fed through the housing 26 by the screw portion 28 of the output shaft 22.

When it is desired to clean the screw portion 28 of the output shaft 22, the retainer 32 is removed and the output shaft 22 is slid rearwardly through the gear box 12 until it is completely withdrawn therefrom. To facilitate such removal, an elongated extractor 29 located in an elongated casing 41 is secured at its front end to the rearward end of the output shaft 22 by bolts 37, and the casing 41 is secured at its front end to the rear of the gear box 12 by bolts 38. The casing 34 is supported at its rear end by a leg 29. The extractor 39 passes through a rear end wall 40 of the casing 41 in screw-threaded relationship therewith and has a handle 42 at its rear end. Thus, rearward removal of the output shaft 22, as shown in FIG. 4, can be effected by manual rotation of the handle 42, as also of course can subsequent replacement of the output shaft 22 after cleaning.

When the shaft 22 has been removed, the front end portion of the casing 41 is supported in any convenient manner, as will be readily apparent to a person skilled in the art, and is detached from the gear box 12 for the actual cleaning of the screw portion 28 of the shaft 22.

Figure 5:
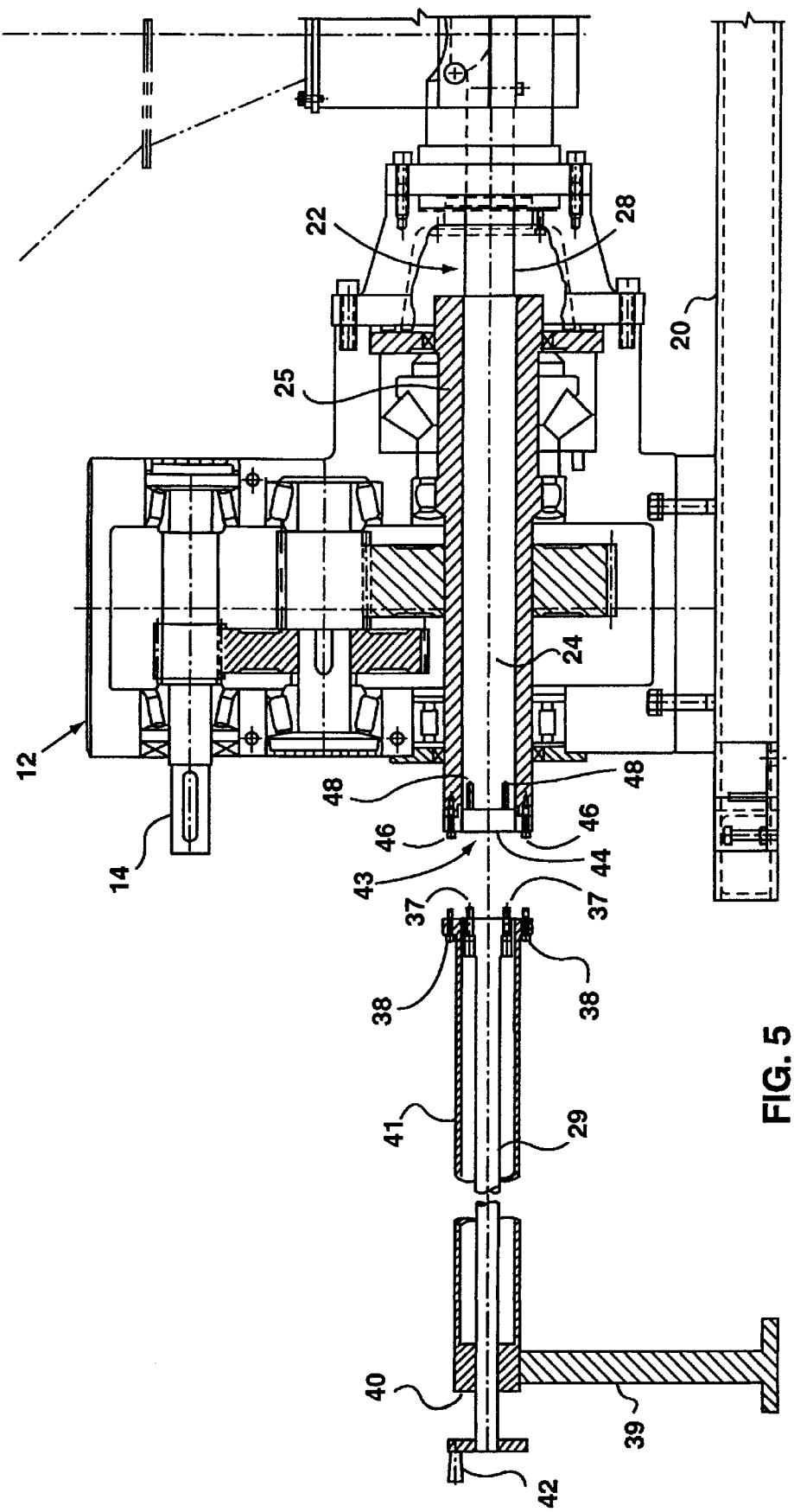
FIG. 5 is similar to FIG. 2 but shows a retainer in accordance with another embodiment of the invention.

FIG. 5 shows an embodiment with an alternative retainer 43 which comprises a bushing 44 secured by bolts 46 to the rear end of the hollow shaft portion 25 and by bolts 48 to the rear end of the shaft main portion 24.

Instead of manually-effected screw removal, it would also of course be possible for this to be carried out by hydraulic or electrical power.

The advantages of the present invention will be readily apparent to a person skilled in the art from the foregoing description. Other embodiments will also be readily apparent, the scope of the invention being defined in the appended claims.

What is claimed is:

1. An extruder assembly having:

a gear box drivable by a motor, an output shaft having a main portion extending through the gear box and rotatable by operation of the motor and gear box, an extruder housing located forwardly of the gear box, said output shaft having a forwardly extending portion extending forwardly from the main portion and passing into the extruder housing and having a screw configuration thereon for feeding plastic material through the housing when the output shaft is rotated, the main portion of the output shaft being axially slidable in the gear box, and the forwardly extending portion having a diameter not greater than the diameter of the main portion whereby the output shaft can be withdrawn from the housing and the gear box by rearward movement therethrough, a retainer operable to retain the output shaft in an operative position for rotation to feed plastic material through the housing and also operable to permit the output shaft to be withdrawn by said rearward movement when desired, said gear box having a rotatable hollow shaft in which said output shaft is slidably mounted whereby said hollow shaft is rotated by operation of the motor and gear box with consequent rotation of the output shaft, and the output shaft is slidably removable from the hollow shaft by said rearward movement, an extractor securable to a rear end of the output shaft for withdrawing the output shaft from the gear box by said rearward movement, and a casing carrying the extractor and securable to a rear end of said hollow shaft, and said extractor being in screw-threaded engagement with the casing whereby the extruder and output shaft can be moved in a rearward direction by rotation of the extractor relative to the casing.

2. An extruder assembly according to claim 1 wherein the retainer comprises a pair of split rings located in an annular groove in the output shaft.

3. An extruder assembly according to claim 1 wherein the retainer comprises a bushing secured to the rear end of the output shaft.

* * * * *